July 21, 1931.  S. E. TRAVIS, JR  1,815,813
METALLIC TRUCK BODY
Filed Feb. 21, 1930   2 Sheets-Sheet 1
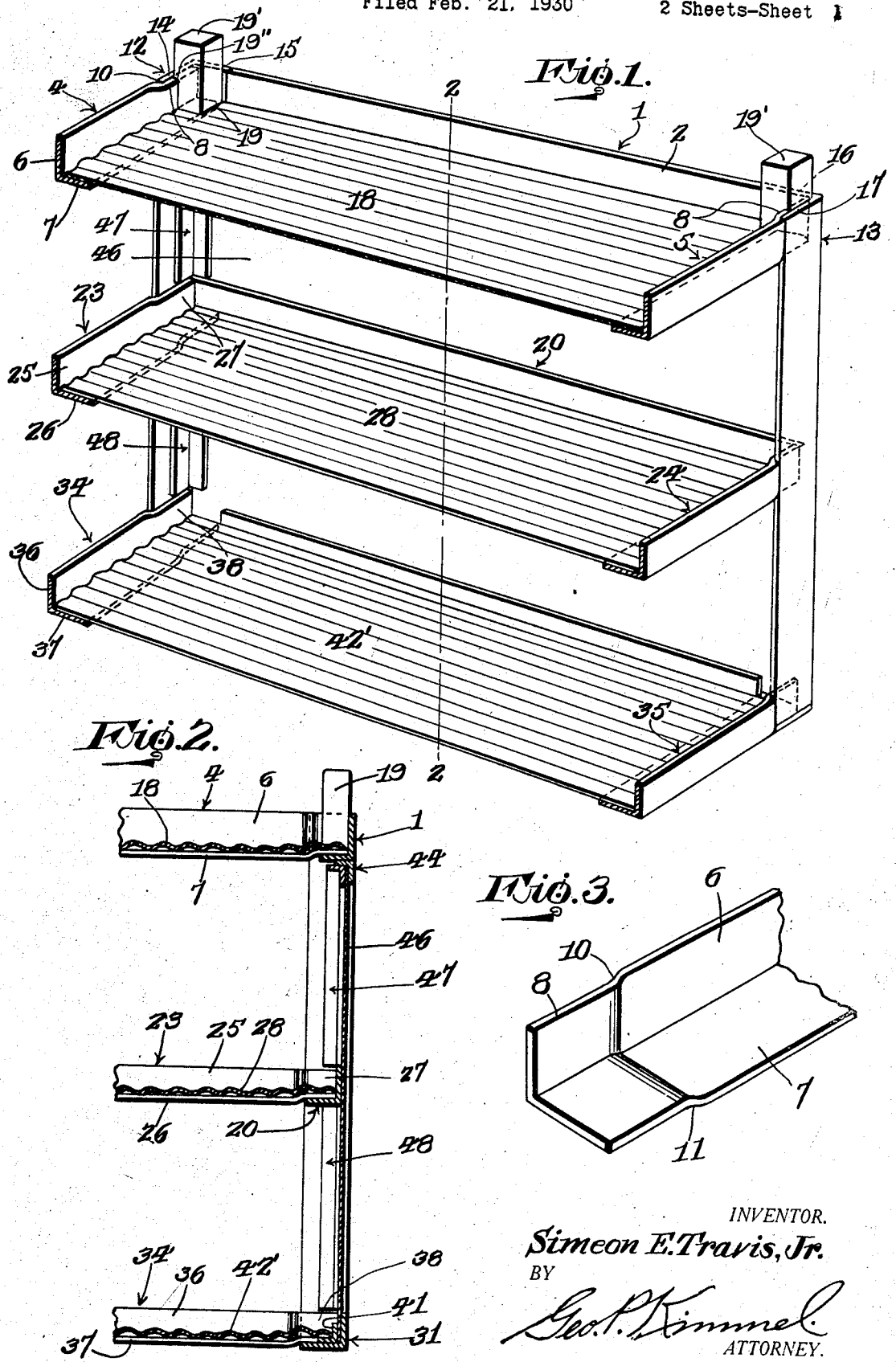
INVENTOR.
Simeon E. Travis, Jr.
BY
Geo. P. Kimmel
ATTORNEY.

July 21, 1931.  S. E. TRAVIS, JR  1,815,813
METALLIC TRUCK BODY
Filed Feb. 21, 1930  2 Sheets-Sheet 2
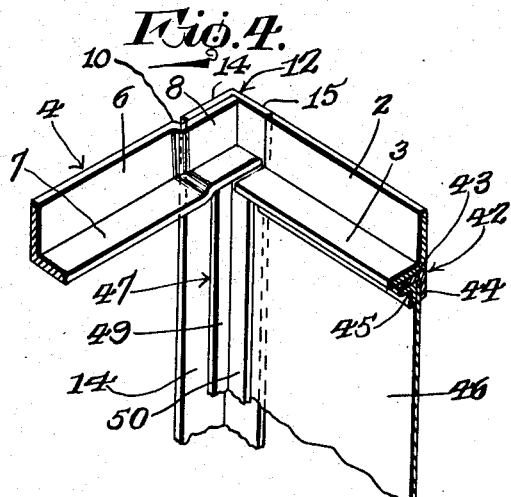
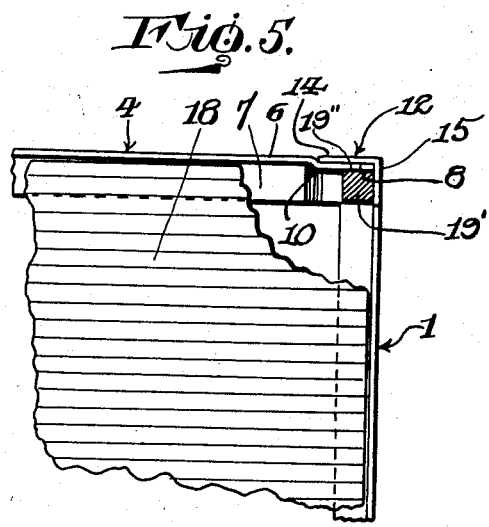
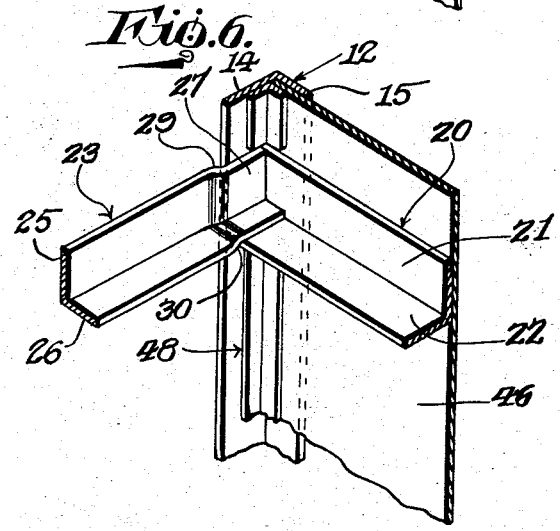
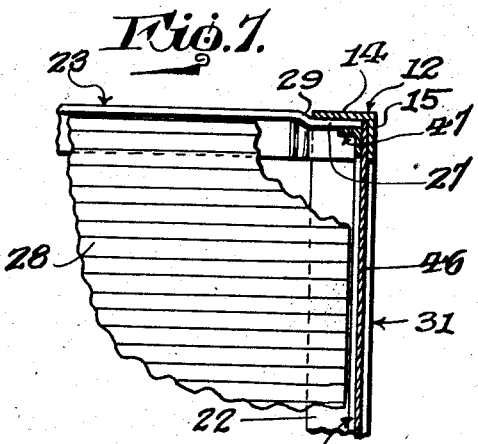
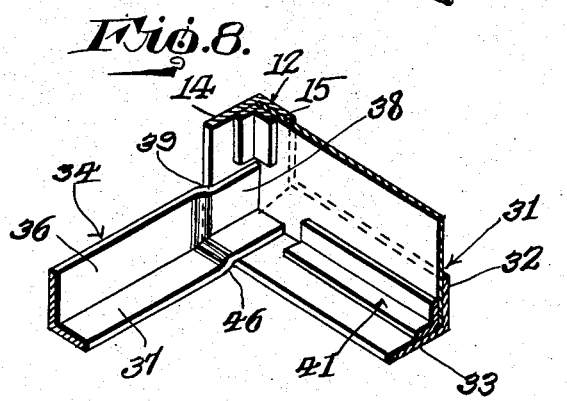
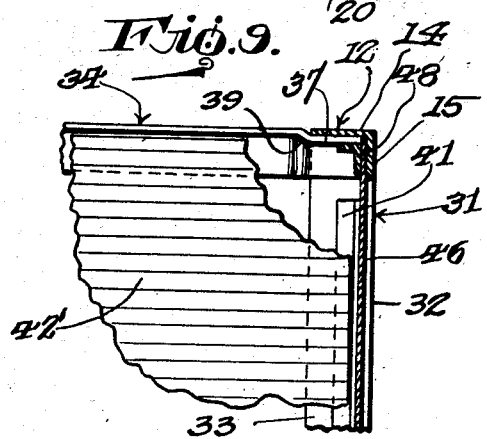
INVENTOR.
Simeon E. Travis, Jr.
BY
Geo. P. Kimmel
ATTORNEY.

Patented July 21, 1931

1,815,813

UNITED STATES PATENT OFFICE

SIMEON E. TRAVIS, JR., OF HATTIESBURG, MISSISSIPPI, ASSIGNOR TO THE WELD-MECH STEEL PRODUCTS CO., A CORPORATION OF MISSISSIPPI

METALLIC TRUCK BODY

Application filed February 21, 1930. Serial No. 430,383.

This invention relates to a truck body designed primarily for the handling of crated, cased or bottled goods, and the invention has for its object to provide, in a manner as hereinafter set forth, a strong, durable, compact, metallic truck body formed of a plurality of decks and so constructed and arranged whereby it can be easily loaded and unloaded and carry its load to the best advantages under all road conditions.

A further object of the invention is to provide, in a manner as hereinafter set forth, a metallic truck body of the plural deck type with new and improved corner structures for the decks thereof for the purpose of insuring the rigidity of the truck body.

A further object of the invention is to provide, in a manner as hereinafter set forth, a metallic truck body of the plural deck type having the side rails of each deck so formed to extend into the corner rails of the truck body, under such conditions overcoming the necessity of mitering the side rails relative to the corner and end rails of the truck body.

A further object of the invention is to provide, in a manner as hereinafter set forth, a metallic truck body of the plural deck type which is simple in its construction and arrangement, durable, thoroughly efficient in its use, readily installed with respect to a chassis, of minimum weight, strong, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations, and modifications can be resorted to which fall within the scope of the claims hereunto appended.

In the drawings wherein like reference characters denote corresponding parts throughout the several views:—

Figure 1 is a fragmentary view in perspective of one end of a truck body of the plural deck type, in accordance with this invention.

Figure 2 is a section on line 2—2, Figure 1.

Figure 3 is a fragmentary view in perspective illustrating the construction or form of each end terminal portion of each side rail of the truck body.

Figure 4 is a fragmentary view in perspective illustrating the manner in which the corners of the upper deck is constructed.

Figure 5 is a fragmentary view in plan and partly broken away illustrating the structural arrangement for the corners of the upper deck.

Figure 6 is a fragmentary view in perspective illustrating the manner in which the corners of the intermediate deck are set up.

Figure 7 is a plan, partly in section, illustrating the manner in which the corners of the intermediate deck are set up.

Figure 8 is a fragmentary view in perspective illustrating the manner in which the corners of the lower deck are set up.

Figure 9 is a plan, partly in section, illustrating the manner in which the corners of the lower deck are set up.

Each end of the truck body is of like construction and only one end is illustrated. The truck body is of that type comprising an upper, an intermediate and a lower deck. The corners of the upper deck are of like arrangement. The corners of the intermediate deck are of like arrangement and the corners of the lower deck are of like arrangement. Each deck includes a pair of end rails, only one of which is illustrated, a pair of side rails and a flooring preferably of the corrugated type, and is so shown, but it is to be understood that any suitable type of flooring may be employed. Four corner rails are included in the truck body structure and which are common to the several decks. A panel is employed for closing each end of the intermediate and lower decks. Only one panel is illustrated. The panels extend from the upper deck, that is, from a point in close proximity to the lower face of the flooring of the upper deck to the end rails of the lower deck. The panels are arranged exteriorly of the ends of the intermediate deck, but extend into the lower deck. The truck body includes other elements of structure than those referred to, and such other elements of structure will be hereinafter set forth.

As before stated, each deck includes a pair of end rails, only one end rail being shown. When the truck body is set up the pair of end rails of each deck are oppositely disposed with respect to each other. One end rail of the upper deck is indicated generally at 1 and comprises a vertically disposed leg 2 and an inwardly extending, horizontal leg 3 which projects from the bottom of the vertical leg 2. The side rails for the upper deck are indicated at 4, 5 and each is formed with a vertical leg 6 and a horizontally disposed leg 7 which extends inwardly from the bottom of the leg 6. The side rails 4, 5 are oppositely disposed with respect to each other. Each side rail 4, 5 has each end terminal portion 8 thereof inset to provide a shoulder 10 on the outer face of the vertical leg 6 and a shoulder 11 on the lower face of leg 7.

Associated with the ends of the side rail 4 is a pair of vertically disposed corner rails, only one of which is shown and is generally indicated at 12. Associated with the ends of the side rail 5 is a pair of vertically disposed corner rails, only one of which is shown and which is indicated generally at 13. The corner rails 12, 13 are oppositely disposed with respect to each other. The rail 12 includes a pair of legs 14, 15 which are disposed at right angles to each other. The rail 13 includes a pair of legs 16, 17 which are disposed at right angles with respect to each other. The legs 14, 16 are termed side legs and the legs 15, 17 end legs, as the legs 14, 16 are arranged at the sides and the legs 15, 17 at the ends of the truck body.

The other end of the upper deck will be constructed in the same manner as that now referred to with respect to the end illustrated. One end terminal portion 8 of the side rail 4 is positioned within the corner rail 12 in a manner whereby the vertical leg of the portion 8 will oppose the inner face of the leg 14 and is welded thereto. The edges of the legs 6 and 7 of the portions 8 abut against the inner face of the leg 15 of the corner rail 12. One end terminal portion of the side rail 5 extends into the corner rail 13. The vertical leg of such portion 8 opposes the inner face of the leg 17 and is welded thereto. The end edges of the legs 6 and 7 of the portion 8 abut the inner face of the leg 16 of corner rail 13. The end edges 2 of the end rail 1 are welded to the edges of the legs 15, 16 of the corner rails 12, 13 respectively. When the side rails 4, 5 are positioned in the manner as stated the shoulders 10 oppose and are welded to the edges of the legs 14, 17 of the corner rails 12, 13 respectively. A corrugated flooring 18 opposes the vertical leg 2 of the end rail 1, the vertical legs 6 of the side rails 4, 5 and are positioned upon and welded to the horizontal leg 3 of the end rail 1 and the horizontal legs 7 of the side rails 4, 5. The corners of the flooring 18 are cut away at at 19 to permit of a sign support 19' to be seated on the horizontal legs 7 of the side rails 4, 5. The supports 19' are welded to said horizontal legs 7 and rabbeted as at 19' to extend over the top edges of such rails.

The top edges of the side rails 4, 5 are flush with the upper edges of the corner rails 12, 13 and the upper edges of the corner rails 14, 15 are flush with the top edge of the vertical leg 2 of the end rail 1.

The intermediate deck includes a pair of end rails of like construction, but which are oppositely disposed when the truck body is set up. Only one intermediate deck end rail is shown and it is illustrated generally at 20. The end rail 20 includes a vertical leg 21 and a horizontal leg 22 which extends inwardly from the bottom of the vertical leg 21. The end rail 20 has its ends abut and welded to the inner faces of the legs 14, 17 of the corner rails 12, 13 respectively. The side rails of the intermediate deck are indicated at 23, 24 and are constructed similar to the side rails 4, 5. The rails 23, 24 are oppositely disposed, the vertical legs thereof being indicated at 25, the horizontal legs thereof at 26, and the inset terminal portions at 27. The vertical legs of the portions 27 oppose the inner faces of the legs 14, 17 of the corner rails 12, 13 respectively and are welded thereto. The horizontal legs 26 are seated upon and welded to the horizontal leg 22 of the end rail 20. The end edges of the portions 27 abut the vertical legs 21 of the rail 20 and are welded thereto. The legs 20, 23 and 24 are welded to the corner rails 12, 13 substantially centrally of the latter.

A corrugated flooring 28 is mounted upon and secured to the horizontal legs 22, 26 of the end and side rails of the intermediate deck. The shoulders 29, 30 provided by the offset or inset portion 27 oppose respectively the edges of the legs 14, 17 and the edge of the leg 22, that is to say the lengthwise edges of legs 14, 17 and 22.

The lower deck includes a pair of oppositely disposed end rails, only one of which is shown and is indicated generally at 31. The rail 31 includes a vertical leg 32 and an inwardly extending, horizontal leg 33 which projects from bottom of leg 32. The side rails of the lower deck are indicated generally at 34, 35, and each includes a vertical leg 36 and a horizontal leg 37 which extends inwardly from the bottom of the vertical leg 36. The side rails 34, 35 are oppositely disposed. The offset or inset terminal portion of each leg 34, 35 is indicated at 38 and the shoulders provided by said portions 38 are designated 39, 40. The vertical legs of the portions 37 oppose the inner faces of the legs 14, 17 of the corner rails 12, 13 and are welded thereto. The horizontal legs of the portions 31 are seated upon and welded to the horizontal leg 33 of the rail 31. The end edges of the portions 37 are spaced from the vertical leg 32 of the rail 31. The shoulders 39 and 40 oppose legs 14 and 17, that is, the end edges thereof, and the end edge of the leg 33. The ends of the legs 32 are mitered and the lower ends of the legs 14, 17 are mitered. The mitered ends of the leg 32 are welded to the mitered ends of the legs 14, 17.

Secured to the upper face of the horizontal leg 33 of the rail 31 is an angle-shaped retaining bar 41 including a horizontal and a vertical leg and with the vertical leg spaced from the vertical leg 32 of the rail 31. The bar 41 is of less height than the leg 32 of the rail 31. Mounted upon the horizontal legs 37 of the side rails 34, 35 and upon the horizontal leg of the bar 41 is a corrugated flooring 42'. The flooring 42' is welded to said horizontal legs. The horizontal leg 33 of the rail 31 is welded to the legs 14, 17 of the corner rails 12, 13.

Positioned against the end rail 1, as well as depending therefrom is an abutment bar 42 formed of a vertically disposed leg 44 a horizontal leg 43 which extends inwardly from the upper end of the leg 44. The leg 44 is flush with the outer face of the leg 2 of the rail 1. The leg 43 is welded to the lower face of the leg 3 of the rail 1. The width of the leg 43 is less than the width of the leg 3.

Depending from the bar 42 is a retaining bar 45 of angle shaped cross section which includes a vertical leg and a horizontal leg, the latter extending inwardly from the upper end of the former. The horizontal leg of the retaining bar 45 is secured to the horizontal leg 43 of the bar 42. The vertical leg of the bar 45 is spaced from the vertical leg 44 of bar 42. The bars 42, 45 are of less length than the end rail 1 and have their ends positioned adjacent the ends of rail 1.

As before stated the ends of the intermediate and lower decks are closed by panels, only one panel being shown and is indicated at 46. The panel is constructed of sheet metal of the desired gauge and has its upper end positioned between the vertical legs of the bars 42, 45. The panel 46 is of a length to extend from the inner face of the leg 14 of corner rail 12 to the inner face of the leg 17 of the corner rail 13. The height of the panel 46 is such as to extend from the bar 42 to the horizontal leg 33 of the end rail 31 of the lower deck. The panel 46 opposes the outer face of the leg 21 of the end rail 20 of the intermediate deck and is welded thereto. The panel 46 at its bottom opposes the inner face of the vertical leg 32 of the end rail 31. The panel 46 at its lower end is retained against the rail 31 by the retaining bar 41. The bar 41 is of less length than the length of the rail 31.

Retaining bars for the panel 46 are carried by the corner rails. Two retaining bars are carried by each corner rail. But one set of retaining bars is illustrated and the description and arrangement of such set applies to the set carried by the other corner rails. The bars of the set of retaining bars are indicated at 47, 48. The bar 47 extends from a side rail of the upper deck to the top of the end rail of the intermediate deck. The bar 48 extends from the bottom of the end rail of the intermediate deck to the top of the side rail of the lower deck. Each bar is of angle-shaped cross section and comprises a pair of legs 49, 50 opposed at right angles to each other. The legs 49 are welded to the inner face of the leg 14 of a corner rail or the leg 17 of a corner rail. The legs 50 are spaced from the leg 14 of a corner rail or leg 16 of a corner rail. The legs 50 bear against the panel 46.

The bars 42, 45 in connection with the bar 41 and end rail 31 retain the panel 46 in position. The bars 47, 48 also act to maintain the panel 46 in position at the sides of the decks. The vertical leg 32 of the end rail 31 is arranged in alignment with respect to the leg 44 of the bar 42. The leg 44 as before stated is flush with the vertical leg 2 of the end rail 1. The vertical leg 21 of the end rail 20 prevents the bulging in of the panel 46 at the intermediate deck and acts as an abutment for the panel.

It is thought that the many advantages of a metallic truck body of the plural deck type, in accordance with this invention, can be readily understood, particularly in view of the fact that the body when set up is rigid, strong and arranged to permit convenient access to each of the decks for storing and removing articles for transportation or articles which have been transported, and although the preferred embodiment of the invention is as illustrated and described, yet it is to be understood that changes in the details of construction can be had which fall within the scope of the invention as claimed.

What I claim is:—

1. A truck body having spaced superposed decks, a set of corner rails, each of angle-shaped cross section to provide a side and an end leg disposed at right angles to each other and common to said decks, each deck including a pair of side and a pair of end rails, each of said side and end rails of angle-shaped cross section to provide a vertical leg and a horizontal leg extending inwardly from the lower end of the vertical leg, each of said side rails having each end terminal portion thereof offset to provide a vertical shoulder, said vertical shoulders opposing the edges of the side legs of the corner rails, the vertical legs of said offset portions opposing the inner faces of the side legs of the corner rails, the lower faces of the horizontal legs of said offset portions being positioned above the upper faces of the horizontal legs of the end rails, the said end rails being secured to said corner rails, said vertical shoulders being secured to the edges of the side legs of the corner rails, and the vertical legs of said offset portions being secured to the side legs of said corner rails.

2. In a truck body, a deck including a side and an end rail each of angle-shaped cross section providing a vertical leg and a horizontal leg extending inwardly from the lower end of the vertical leg, a corner rail formed of a side leg and an end leg disposed at right angles with respect to each other, said side rail having an offset terminal portion to provide a vertical shoulder opposing the edge of said side leg, the vertical leg of said offset portion opposing the inner face of said side leg, the lower face of the horizontal leg of said offset portion being positioned above the upper face of the horizontal leg of the end rail, the said end rail being secured to said corner rail, said vertical shoulder being secured to the edge of said side leg, and the vertical leg of said offset portion being secured to said side leg.

3. In a metallic truck body, a deck including a side, an end and a corner rail, said side and said corner rail and said end rail consisting of a pair of legs disposed at right angles to each other, said side rail having an offset terminal portion providing a shoulder opposing the edge of one of the legs of the corner rail, said portion opposing the inner face of said leg of said corner rail and abutting the inner face of the other leg of said corner rail, and said end rail having the end edge of one of its legs opposing the edge of the leg of such corner rail and an edge of said offset portion, the said portion being secured to said corner rail, and the said end rail having one of its legs secured to said offset portion.

4. In a metallic truck body, a deck including a side and an end and a corner rail, each of said rails consisting of a pair of legs disposed at right angles to each other, said side rail having an offset terminal portion providing a vertical and a horizontal shoulder, said vertical shoulder opposing the edge of one of the legs of the corner rail and said horizontal shoulder opposing the edge of one of the legs of the end rail, said end rail abutting the inner face of one of the legs of the corner rail, said offset portion opposing the inner face of one of the legs of the corner rail, seating on one of the legs of the end rail and abutting the other of the legs of said end rail, said end rail being secured to said corner rail, and said offset portion being secured to one of the legs of the corner rail and to the legs of the end rail.

5. In a metallic truck body, a deck including a side, an end and a corner rail, each of said rails consisting of a pair of legs disposed at right angles to each other, said side rail having an offset terminal portion providing a vertical and a horizontal shoulder, said vertical shoulder opposing the edge of one of the legs of the corner rail and said horizontal shoulder opposing the edge of one of the legs of the end rail, said end rail abutting the legs of the corner rail, said offset portion opposing the inner face of one of the legs of the corner rail and seating on one of the legs of said end rail, said end rail being secured to said corner rail, and said offset portion being secured to one of the legs of the corner rail and to the legs of the said end rail.

In testimony whereof, I affix my signature hereto.

SIMEON E. TRAVIS, Jr.